US011910151B2

(12) United States Patent
Schillebeeckx et al.

(10) Patent No.: US 11,910,151 B2
(45) Date of Patent: Feb. 20, 2024

(54) AUDIO HEADSET

(71) Applicant: Freedman Electronics Pty Ltd, Silverwater (AU)

(72) Inventors: Pieter Schillebeeckx, Silverwater (AU); Stephanie Gertrude Winkler, Silverwater (AU); Samuel Dean Trewartha, Silverwater (AU); Sun Kyung Sunwoo, Silverwater (AU)

(73) Assignee: FREEDMAN ELECTRONICS PTY LTD, Silverwater (AU)

( * ) Notice: Subject to any disclaimer, the term of this patent is extended or adjusted under 35 U.S.C. 154(b) by 57 days.

(21) Appl. No.: 17/592,722

(22) Filed: Feb. 4, 2022

(65) Prior Publication Data

US 2023/0254627 A1 Aug. 10, 2023

(51) Int. Cl.
*H04R 25/00* (2006.01)
*H04R 1/10* (2006.01)

(52) U.S. Cl.
CPC .................................... *H04R 1/105* (2013.01)

(58) Field of Classification Search
CPC .. H04R 1/1008; H04R 1/1033; H04R 1/1041; H04R 3/04; H04R 5/04; H04R 5/033
See application file for complete search history.

(56) References Cited

U.S. PATENT DOCUMENTS 11,185,120 B2 * 11/2021 Manni ..................... A42B 1/22
2009/0285435 A1 * 11/2009 Nelson .................... F16C 11/06 381/378
2020/0389719 A1 * 12/2020 Morris ................. H04R 5/0335

* cited by examiner

*Primary Examiner* — Amir H Etesam
(74) *Attorney, Agent, or Firm* — Lathrop GPM LLP; Richard Beem; Alex Shtraym

(57) ABSTRACT

The present invention relates generally to audio headsets and more particularly to a headset including improved comfort and functionality. The headset may be shaped to provide a comfortable and proper seal to, for example, exclude ambient noise. In addition, the headset may configured to include various interchangeable components and may further include several input ports. Advantageously, the headset may be modular and may facilitate coupling with one or more interfaces, such as an audio source and a microphone.

20 Claims, 12 Drawing Sheets

AUDIO HEADSET

FIELD OF THE INVENTION

The present invention relates generally to the field of audio headsets, and more particularly to a headset including improved comfort and functionality.

BACKGROUND

Headphones are often used to output audio to a user via a pair of ear cups. Similar to headphones, headsets typically output audio to a user and also include a microphone to, for example, facilitate communicating with others.

Headsets may be used for various applications, such as video gaming. Video games have become increasingly complex and allow gamers to play against individuals via the internet. In addition to the visual aspects of the video games, audio plays an important part in providing the gaming experience. Usually, a gamer will wear a headset that provides game audio to the user's ears, as well as includes a microphone to allow the gamers to communicate with each other.

Game audio often refers to audio generated by a video game, usually during game play. Such audio may include musical soundtracks, sound effects, and other audio. The importance of game audio often depends on the type of video game or the type of interactions involved. For example, in puzzles games, audio may serve to enhance the game play but may not be crucial for proper gamer interaction with the video game. In contrast, game audio may play an important or even crucial role in achieving favorable results for certain video games. For instance, the ability to hear sounds of the surrounding gaming environment may be important in a first-person shooter. Examples of audio that gamers rely on may include footsteps of approaching enemies, doors opening, vehicles, and other game audio. Based on the audio received, a gamer may, for example, communicate with teammates, anticipate their next move, determine their next response, or perform a certain action.

With the increased depth and complexity of video games, users may wear a headset for prolonged or extended periods of time. However, wearing conventional headphones for many hours may cause ear fatigue and discomfort. One major discomfort results from the temperature increase around the gamer's ear after a period of use. This discomfort grows as the length of continuous use extends. In addition, most headsets often do not sufficiently exclude ambient noise.

Conventional headsets also often include fixed constructions such that there is little or no opportunity to easily upgrade or interchange individual components. As a result, conventional headsets may be difficult to repair and may require replacement after a limited number of uses.

Therefore, there is a need for an improved headset.

SUMMARY

The present invention relates generally to the field of audio headsets, and more particularly to a headset including improved comfort and functionality.

In one aspect, the headset may include one or more earcup assemblies and a headband assembly. The headband assembly may include a bracket having one or more slots. Each slot of the bracket may be configured to receive a locking mechanism. The locking mechanism may be operable for adjusting a distance between the headband assembly and the one or more earcup assemblies. Further, the headset may include a post that is pivotally attach to an earcup assembly and the locking mechanism to facilitate pivotal movement of the earcup assembly with respect to the headband assembly.

The headband assembly may further include a cushion assembly removably coupled to the bracket. In addition, the cushion assembly may be configured to connect to one or more stoppers of the headband assembly. The cushion assembly may include a top section detachably coupled to a bottom section via, for example, a hook and loop fastener. The top section may include a channel for guiding a flat wire.

The locking mechanism of the headset may be a cam assembly including a housing and thumb pad. The housing may contain a cam and a lockpad. The thumb pad may include a rod having a pin that is configured to interface with the cam. In operation, when thumb pad is rotated, locking mechanism may be configured to compress and secure to the bracket. When unlocked, the user may adjust a distance between the headband assembly and the earcup assembly.

The earcup assemblies of the headset may include a frame, a driver assembly, and an earpad. The driver assembly may be detachably connected to the frame. The earpad may be detachably connected to the driver assembly. As a result, a user may easily interchange various components of each earcup assembly.

It is also contemplated that the earpad is formed of one or more layers. One layer may be configured to cover the remaining layers and formed of an acoustically absorbent material, such as alcantara. Another layer may be a memory foam layer that provides additional comfort to a user. Yet another layer may be a cooling layer, such as a cooling gel to, for example, reduce ear fatigue and discomfort.

The earcup assembly may further comprise a bayonet mount configured to couple with a corresponding bayonet fastener. In addition, the earcup assembly may include an input port. For example, one earcup assembly may include a first input port configured to couple with an audio source and the other earcup assembly may include a second input port configured to couple with a microphone.

While the invention is susceptible to various modifications and alternative forms, specific exemplary embodiments thereof have been shown by way of example in the drawings and have herein been described in detail. It should be understood, however, that there is no intent to limit the invention to the particular embodiments disclosed, but on the contrary, the intention is to cover all modifications, equivalents, and alternatives falling within the scope of the invention as defined by the appended claims.

BRIEF DESCRIPTION OF THE DRAWINGS

Embodiments are illustrated by way of example and not limitation in the figures in the accompanying drawings, in which like references indicate similar elements and in which.

DETAILED DESCRIPTION OF THE INVENTION

Figure 1:
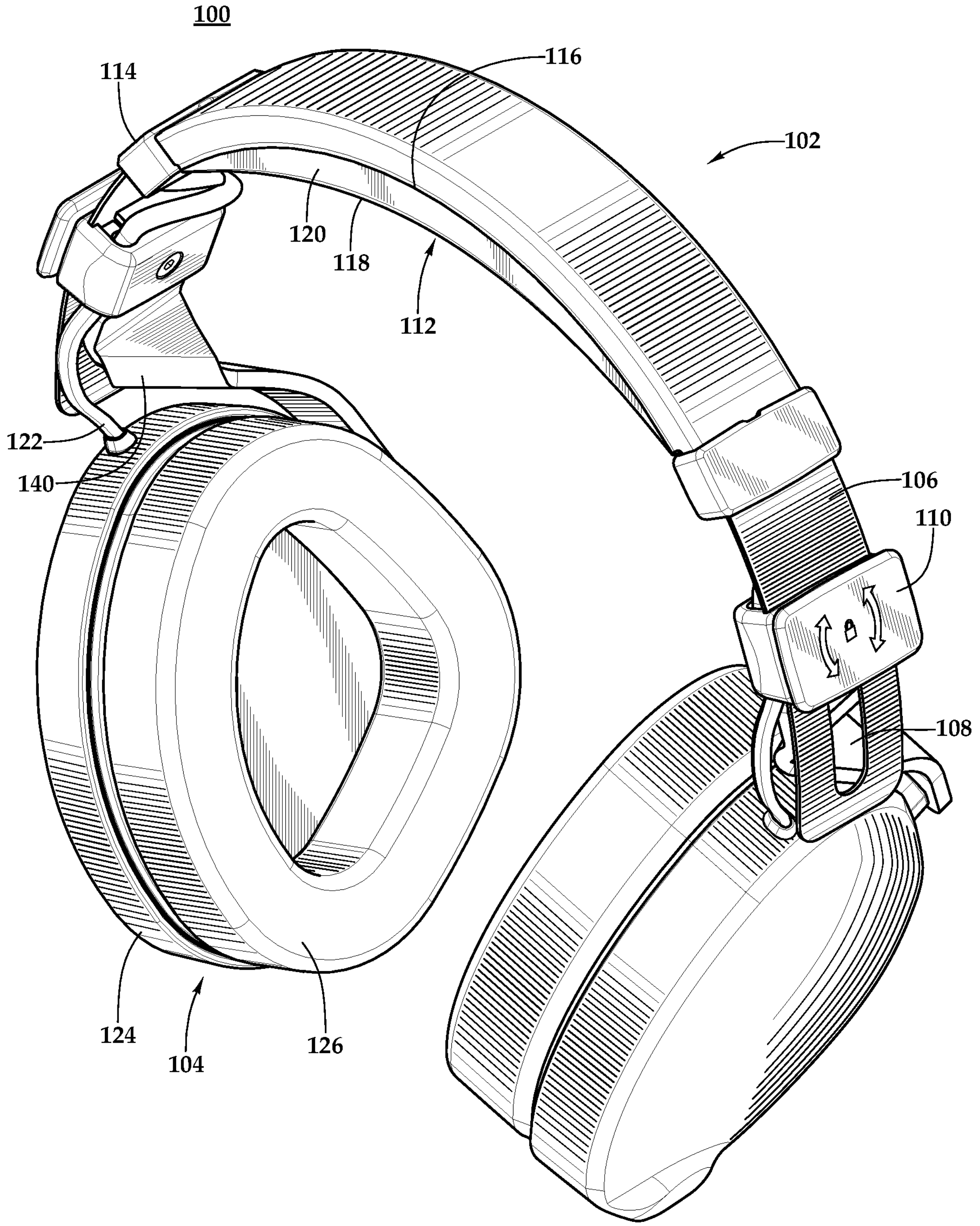
FIG. 1 illustrates a perspective view of a headset.

The present invention relates generally to audio headsets and more particularly to a headset including improved comfort and functionality. The headset may be shaped to provide a comfortable and proper seal to, for example, reduce ambient noise. In addition, the headset may be configured to include various interchangeable components and may further include several input ports. Advantageously, the headset may be modular and also may facilitate coupling with one or more interfaces, such as an audio source and a microphone.

Turning now to the drawings wherein like numerals represent like components, FIGS. 1-4 illustrate an exemplary headset 100 shaped to fit comfortably over the top of the user's head. As shown, headset 100 may include a headband assembly 102 and an earcup assembly 104. A locking mechanism 110 may be configured to adjust a distance between headband assembly 102 and earcup assembly 104, as detailed below.

As shown, headset 100 also may include a bracket 140 pivotally coupling earcup assembly 104 to locking mechanism 110. Bracket 140 may be curved to conform to the shape of earcup assembly 104. Bracket 140 may be configured to facilitate pivotal movement of earcup assembly 104 with respect to the headband assembly 102 such that a force on the head of the user may be spread evenly around their ears.

Exemplary Headband Assembly 100

As illustrated in FIGS. 1-4, headband assembly 102 may include a headband 106 including one or more preferably longitudinal slots 108. Slots 108 may be formed on either end of headband 106 and configured to receive locking mechanism 110. Headband 106 may be made of a suitable material, such as plastic, metal, or some other lightweight material.

Figure 2A:
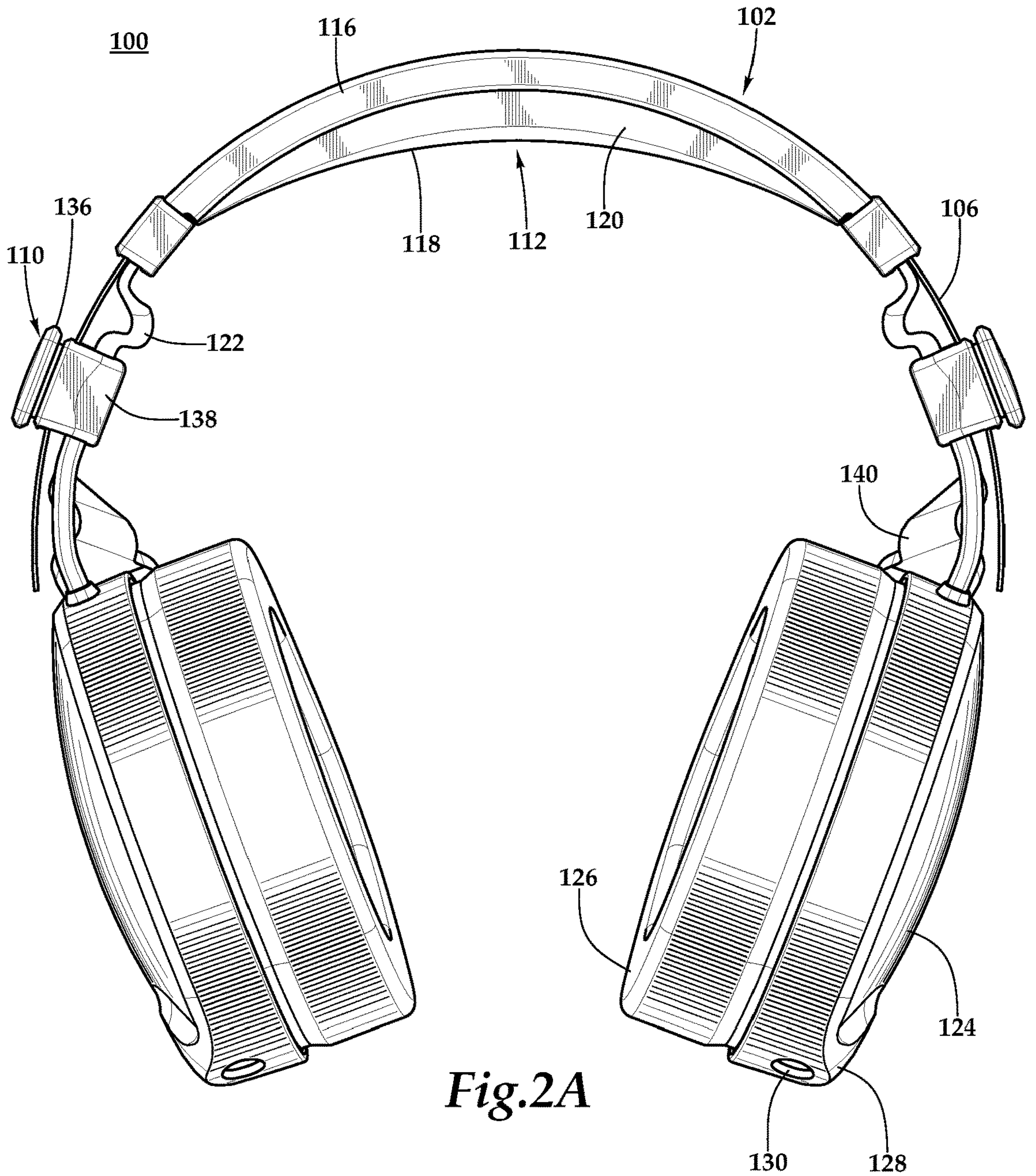
FIG. 2A illustrates a front view of the headset of FIG. 1.

As shown in FIG. 2A, a cushion assembly 112 may be removably attached to headband 106. Cushion assembly 112 may include a top section 116 and a bottom section 118. Bottom section 118 may include a padding 120 formed on a brace 119. Padding 120 may be, for example, a gel, foam or other suitable material.

Figure 2B:
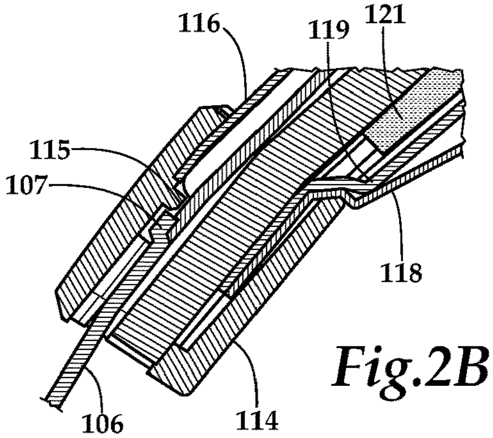
FIG. 2B illustrates a sectional view of an exemplary headband assembly of the headset of FIG. 1.
Figure 3:
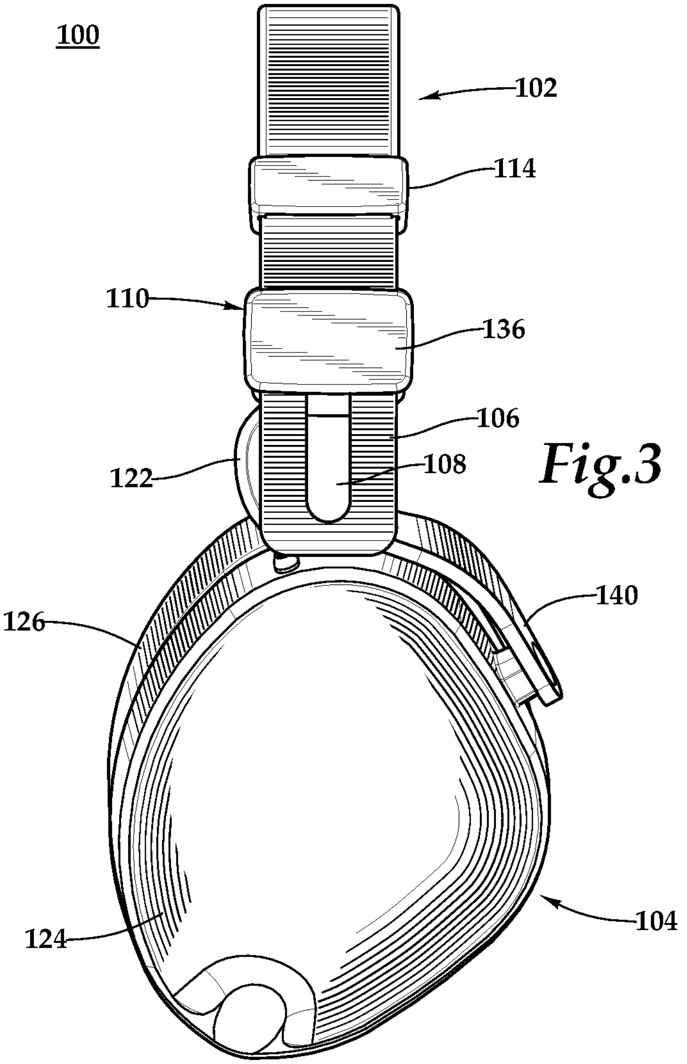
FIG. 3 illustrates a side view of the headset of FIG. 1.
Figure 4:
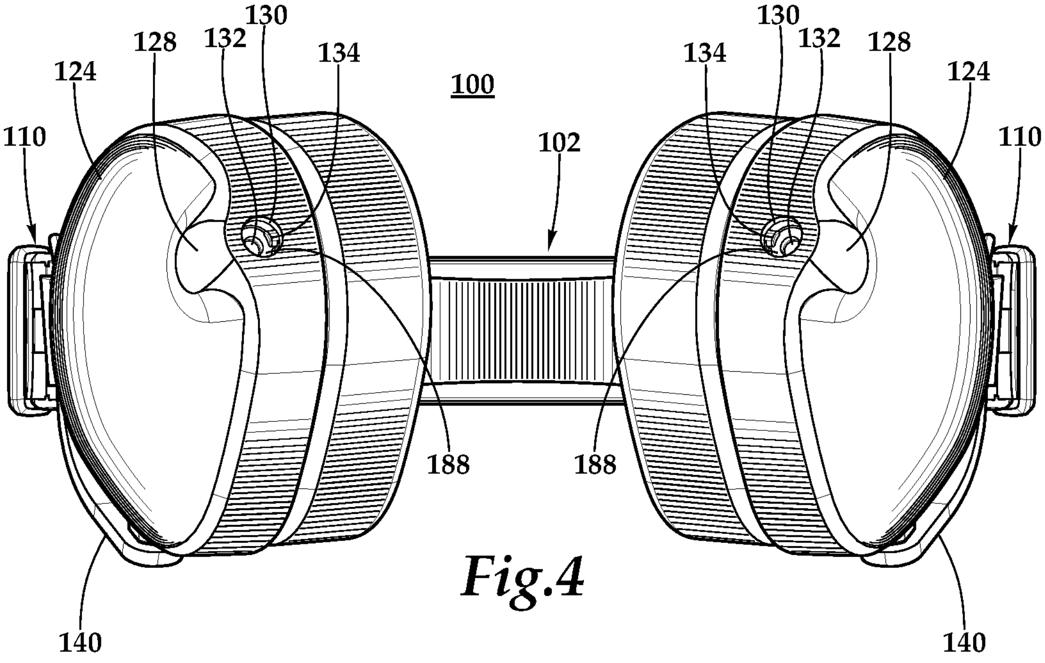
FIG. 4 illustrates a bottom view of the headset of FIG. 1.

As shown in FIG. 2B, each segment 116, 118 of cushion assembly 112 may removably attach to headband 106 via one or more stoppers 114. Stopper 114 may be slidably engaged with headband 106. A bulge 107 of headband 106 is configured to pry against a rim 115 of stoppers 114 to secure cushion assembly 112 to headband 106.

In addition to coupling to headband 106 via stoppers 114, top section 116 of cushion assembly 112 may include a knob (not shown) configured to be inserted into an aperture 160 (FIG. 6) of headband 106. Further, extra fabric of top section 116 may wrap around and enclose headband 106.

Bottom segment 118 of cushion assembly 112 may be detachably coupled to top segment 116 by a hook-and-loop type fastener. It is further contemplated that segments 116, 118 of padding 120 may be detachably coupled to one another via, for example, buttons, hooks, clasps, pins, or other known fasteners.

As shown in FIG. 1 and FIG. 2A, a conductive cable or wire 122 interconnects each earcup assembly 104 and may be configured to carry an audio signals. Wire 122 may be substantially flat and flexible, and may run along headband 106 through locking mechanism 110, cushion assembly 112, and stoppers 114. Specifically, locking mechanism 110 may include a cable slit 150 (FIG. 5) configured to receive wire 122. Similarly, top segment 116 of cushion assembly 112 may include a channel 121 (FIG. 2B) into which wire 122 may be positioned substantially flush with the surface of top segment 116 such that wire 122 does not interfere with the coupling of cushion assembly 112 to headband 106.

Exemplary Locking Mechanism 110

Figure 5:
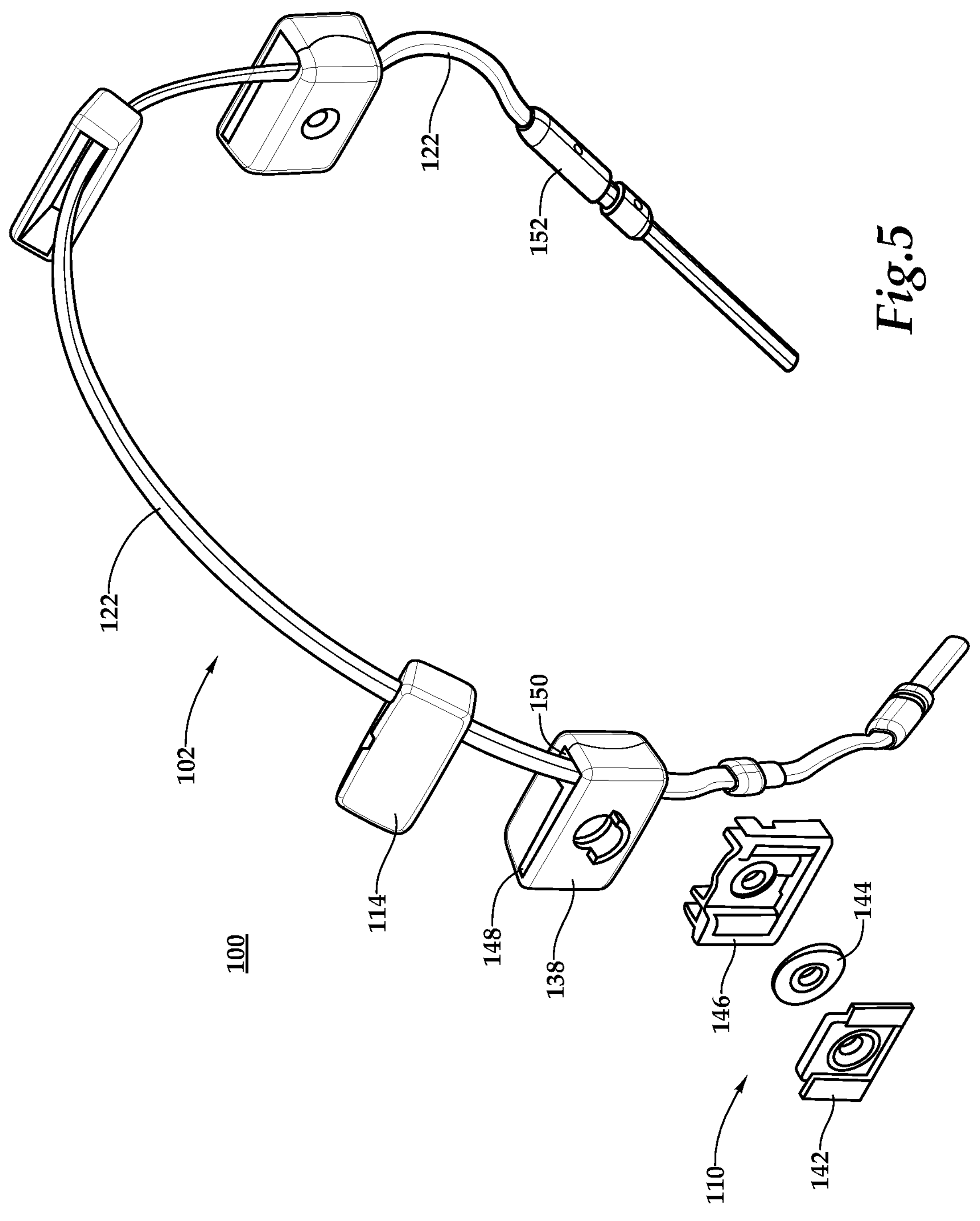
FIG. 5 illustrates an exploded view of an exemplary locking mechanism.

FIGS. 5-10D illustrate an exemplary locking mechanism 110 operable to adjust a distance between headband assembly 102 and earcup assembly 104. As shown, locking mechanism 110 may include a housing 138. Housing 138 may be configured to contain one or more actuating components. While various actuating components are contemplated, as illustrated in FIG. 5, housing 138 may contain a cam assembly including, for example, a lockpad 142, a cam 144, and a retainer 146.

Figure 7:
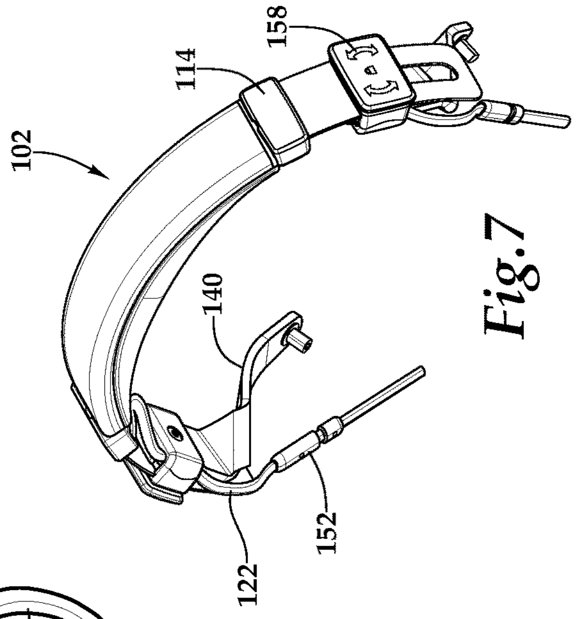
FIG. 7 illustrates an exemplary headband assembly including the locking mechanism of FIG. 5.
Figure 6:
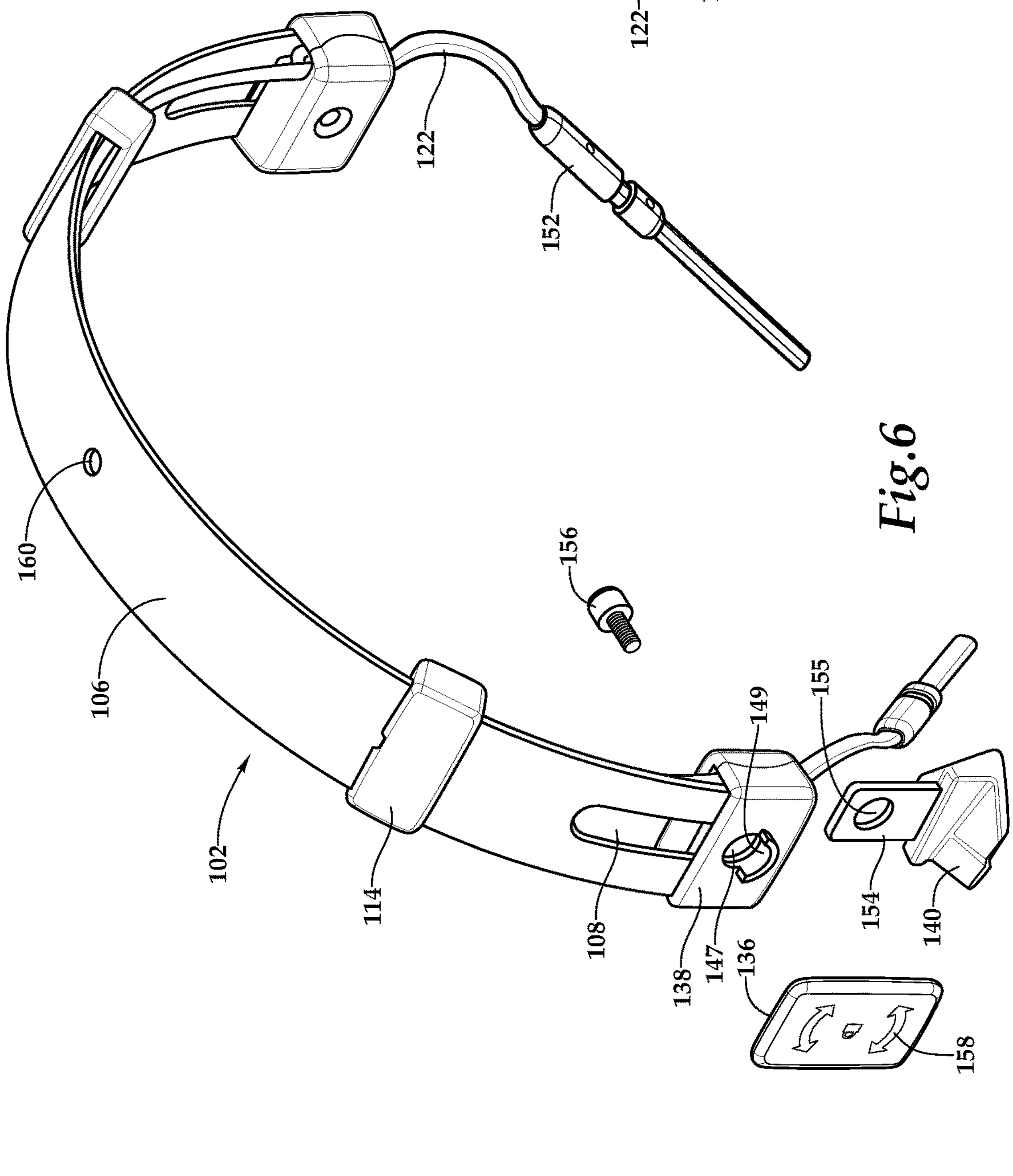
FIG. 6 illustrates the locking mechanism of FIG. 5.

As shown in FIGS. 5-7, housing 138 also may include a substantially circular opening 147 for receiving a thumb pad 136, a substantially semi-circular lip 149 for limiting the rotation of thumb pad 136, a bracket slit 148 for receiving headband 106 and, as discussed above, a cable slit 150 for receiving wire 122. Thumb pad 136 may include indicia 158, such as symbols or words, such that locking mechanism 110 may be easily manipulated by the user, as detailed below.

Figure 8:
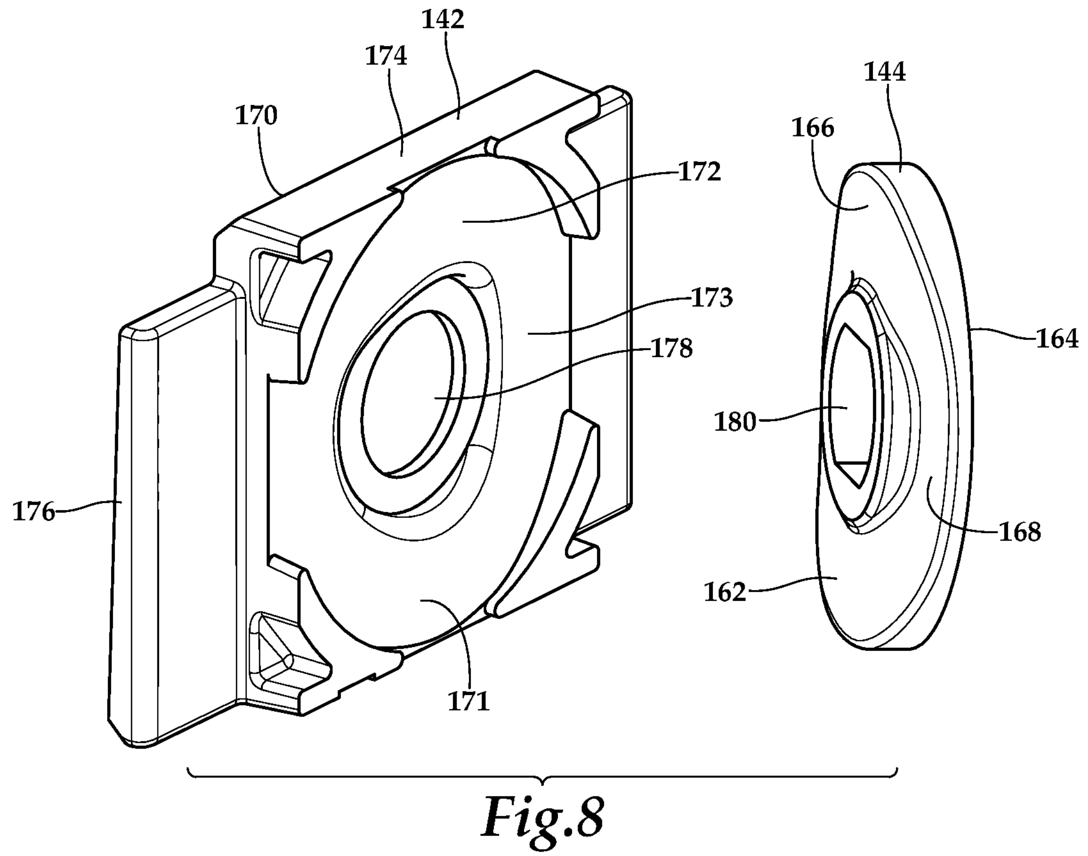
FIG. 8 illustrates a lockpad and a cam of an exemplary locking mechanism.
Figure 9A:
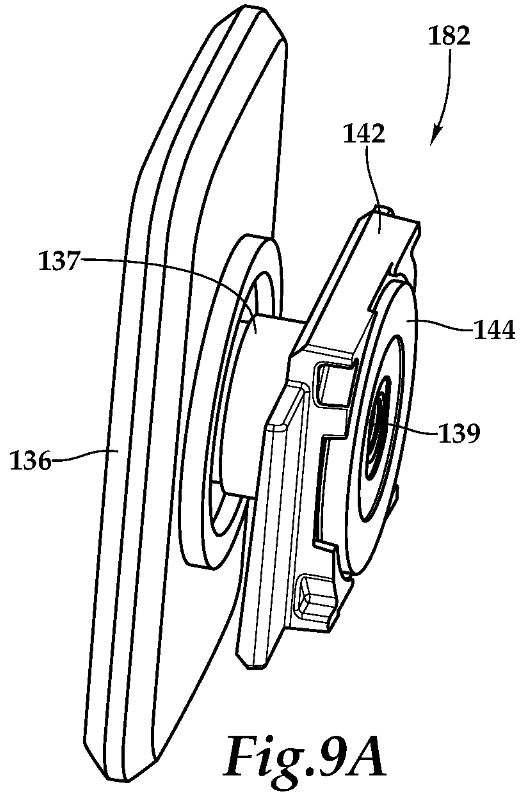
FIG. 9A illustrates a perspective view of a locking mechanism in an unlocked position.
Figure 9B:
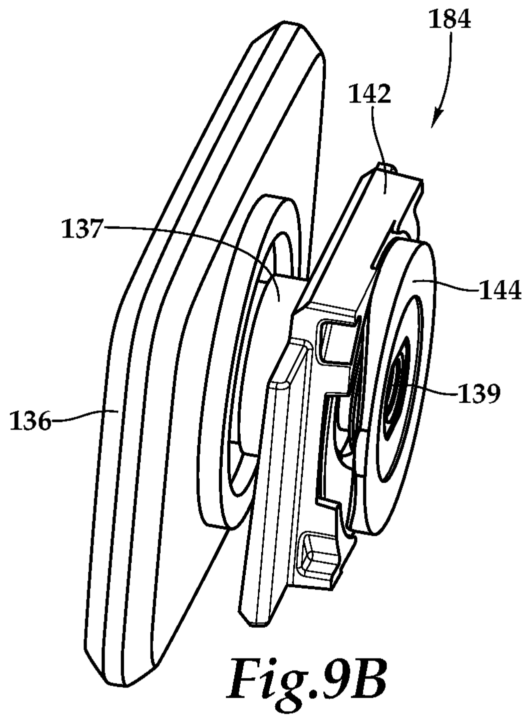
FIG. 9B illustrates a perspective view of a locking mechanism in an locked position.
Figure 10A:
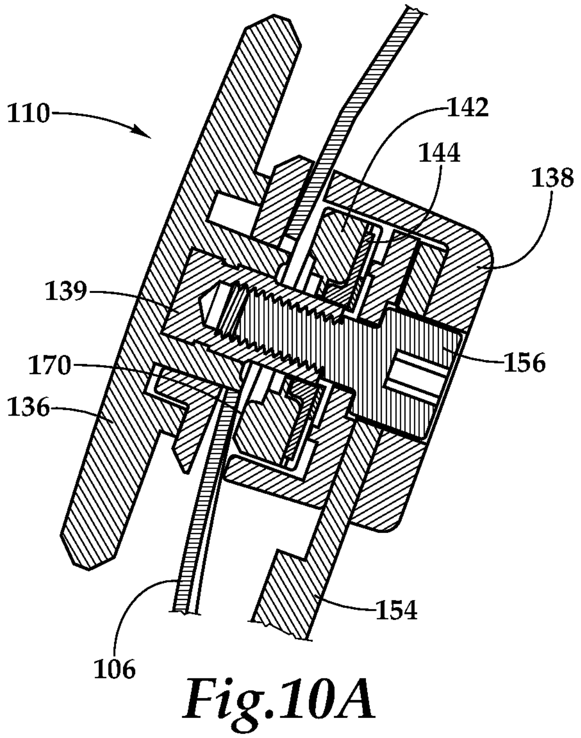
FIG. 10A illustrates a section view of a locking mechanism in an unlocked position.
Figure 10B:
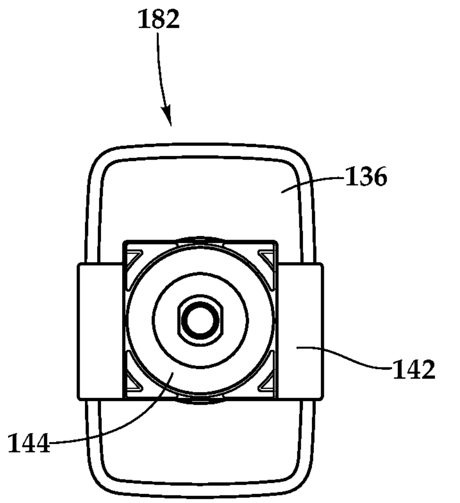
FIG. 10B illustrates a rear view of a locking mechanism in an unlocked position.
Figure 10C:
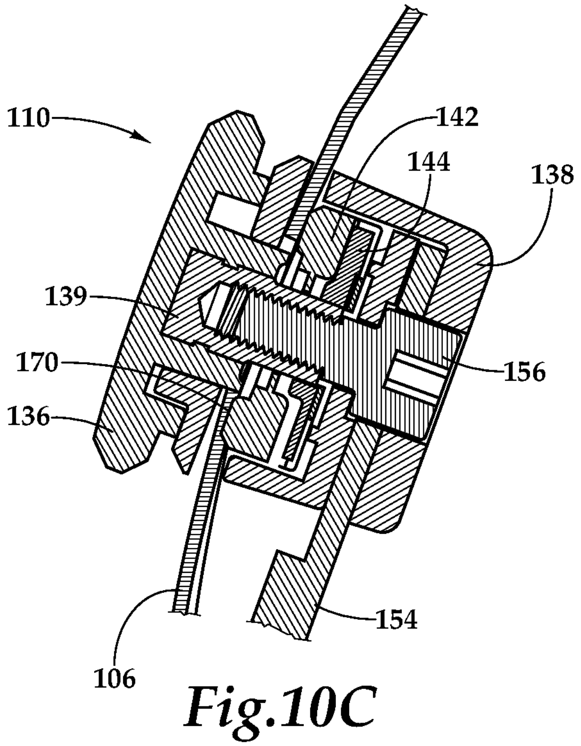
FIG. 10C illustrates a section view of a locking mechanism in a locked position.
Figure 10D:
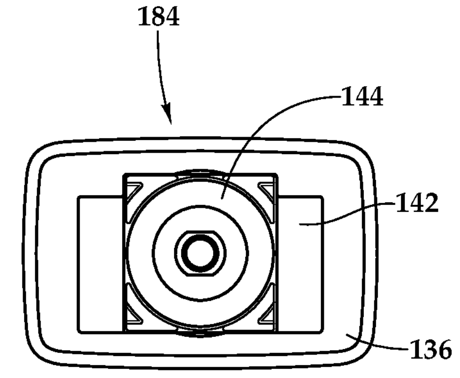
FIG. 10D illustrates a bottom view of a locking mechanism in a locked position.

FIG. 8 illustrates an exemplary lockpad 142 and cam 144 of locking mechanism 110. As shown, lockpad 142 may include a front surface 170 and an opposing back surface 171. Front surface 170 may be substantially flat or include a slight curve with a large radius corresponding to the headband 106 curvature and radius. Back surface 171 may include protrusions 172 and depressions 173. Lockpad 142 may further include a core section 174 with appendages 176 on either end. Core section 174 may include an opening 178. As shown, back surface 171 of core section 174 may be adapted to receive cam 144 such that opening 178 of lockpad 142 lines up with a rounded cavity 180 of cam 144.

Cam 144 may be substantially circular and may include a front surface 162 and a substantially flat back surface 164.

As shown, front surface 162 of cam 144 also may include protrusions 166 and depressions 168, each of which is configured to align with protrusions 172 and/or depressions 173 of lockpad 142, as detailed below.

FIGS. 9A-9B and FIGS. 10A-10D illustrate an exemplary connection of thumb pad 136 to housing 138 via a rod 137 having a pin 139. Rod 137 may be configured to pass through slot 108 in headband 106 and an opening 155 of extension member 154 of bracket 140 (FIG. 6). Pin 139 may be configured to pass through opening 178 of lockpad 142. Pin 130 also may be shaped to interface with rounded cavity 180 to turn cam 144. As shown, pin 139 may include a threaded interior configured to receive a corresponding fastener 156, thereby securing locking mechanism 110 to headband 106 and bracket 140.

In an exemplary operation, a rotation of thumb pad 136 results in a corresponding rotation of cam 144. While thumb pad is shown to rotate approximately 90 degrees, other rotations are contemplated including, for example, 180 degrees and 360 degrees.

As shown, rotation of thumb pad 136 may correspond to an unlocked position 182 or a locked position 184 of locking mechanism 110. More specifically, when thumb pad 136 is rotated to unlocked position 182, pin 139 may interface with cavity 180 to turn cam 144 such that protrusions 172 of lockpad 142 align with depressions 168 of cam 144. When thumb pad 136 is rotated to locked position 184, pin 139 may interface with cavity 180 to turn cam 144 such that protrusions 172 of lockpad 142 align with protrusions 166 of cam 144. In other words, when rotating thumb pad 136, depressions 168 of cam 144 may correspond to unlocked position 182 and protrusions 166 of cam 144 may correspond to locked position 184.

As shown in FIGS. 10A-10D, when locking mechanism is in locked position 184, front surface 170 of lockpad 142 is configured to compress headband 106 between housing 138 and thumb pad 136. When locking mechanism is in unlocked position 182, front surface 170 of lockpad 142 is configured to decompress headband 106, thereby facilitating adjustment of a distance between headband assembly 102 and corresponding earcup assembly 106.

Exemplary Earcup Assembly 104

As shown in FIGS. 1-4, headset 100 may further include one or more earcup assemblies 104 comprising interchangeable components, as detailed below. Earcup assemblies 104 may be D-shaped to resemble the structure of a user's ear and head. Other shapes of earcup assemblies 104 are contemplated including, for example, a cup, cone or other forms that may comfortably contact, and in some cases seal to, the user's head.

The height of earcup assembly 104 may range between about eighty millimeters to about one hundred and twenty millimeters, and preferably between about ninety millimeters and one hundred millimeters. In one embodiment, earcup assembly 104 has an approximate height of about ninety-five millimeters.

The width of earcup assembly 104 may range between about sixty millimeters to about ninety millimeters, and preferably between about seventy millimeters and eighty millimeters. In one embodiment, earcup assembly 104 has an approximate height of about seventy-five millimeters.

As shown in FIGS. 1-4 and FIG. 11, earcup assembly 104 may include a frame 124 and an earpad 126. Between frame 124 and earpad 126, earcup assembly 104 may include a driver assembly 186 and a seal 188.

Figure 13B:
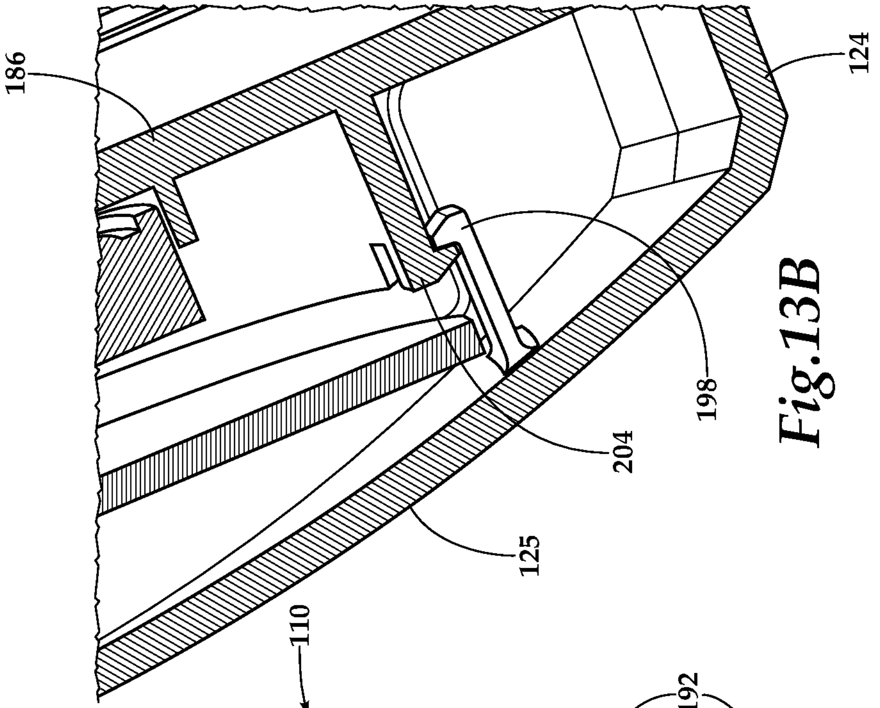
FIG. 13B is a sectional view illustrating the exemplary connection of the frame to a driver assembly of FIG. 13A.
Figure 13A:
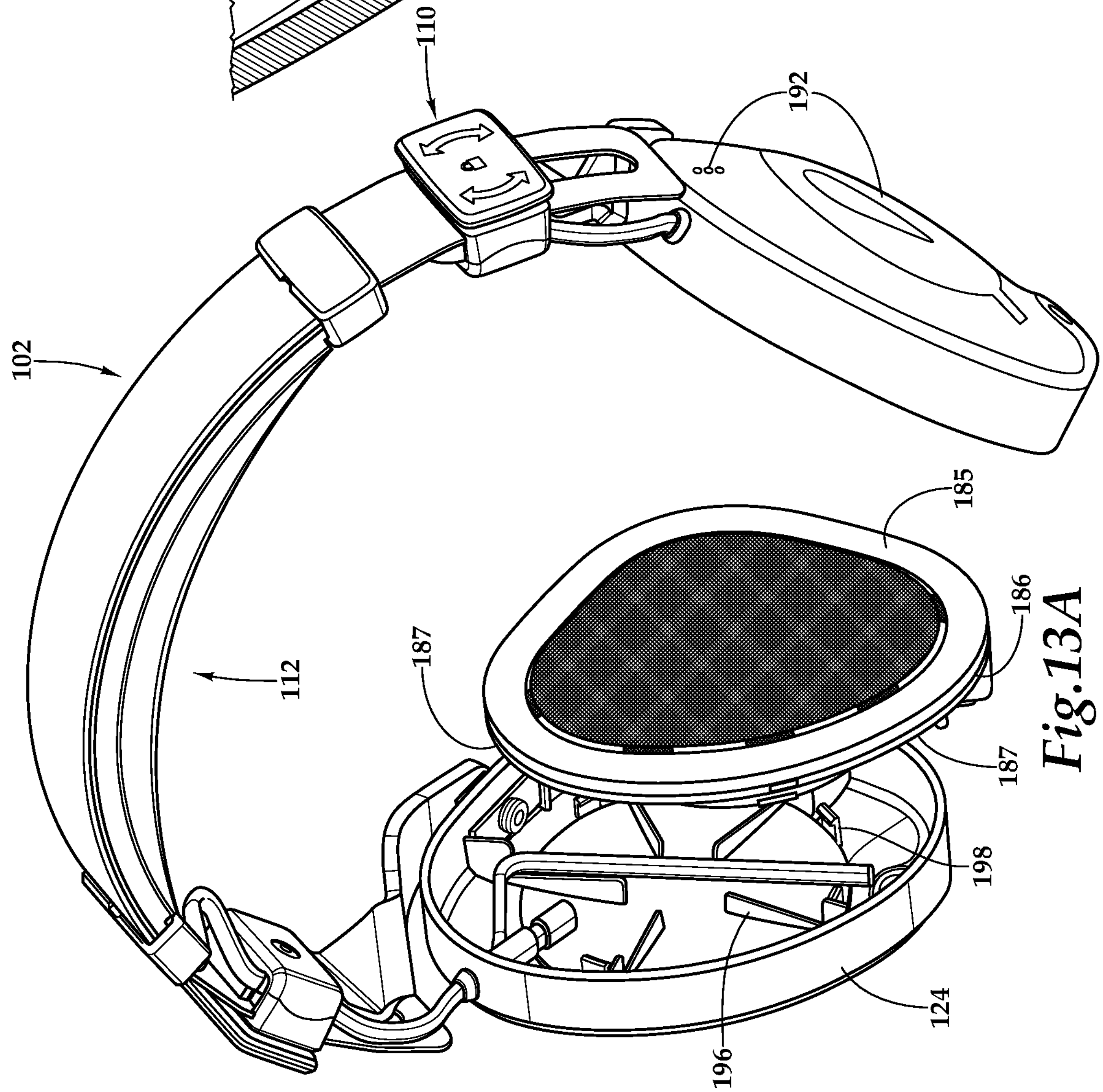
FIG. 13A illustrates an exemplary connection of the frame to a driver assembly.

Frame 124 may be formed of a plastic material or the like that can be curved (such as by molding) to the desired shape and size. As shown, frame 124 may include an interior surface 123 and an exterior surface 125. Interior surface 123 may include ribs 196 and connectors 198. Ribs 196 may be configured to reinforce the structure of frame 124. Connectors 198 of frame 124 may facilitate attachment to, for example, driver assembly 186 having corresponding connectors 204 (FIGS. 13A-13B).

Figure 11:
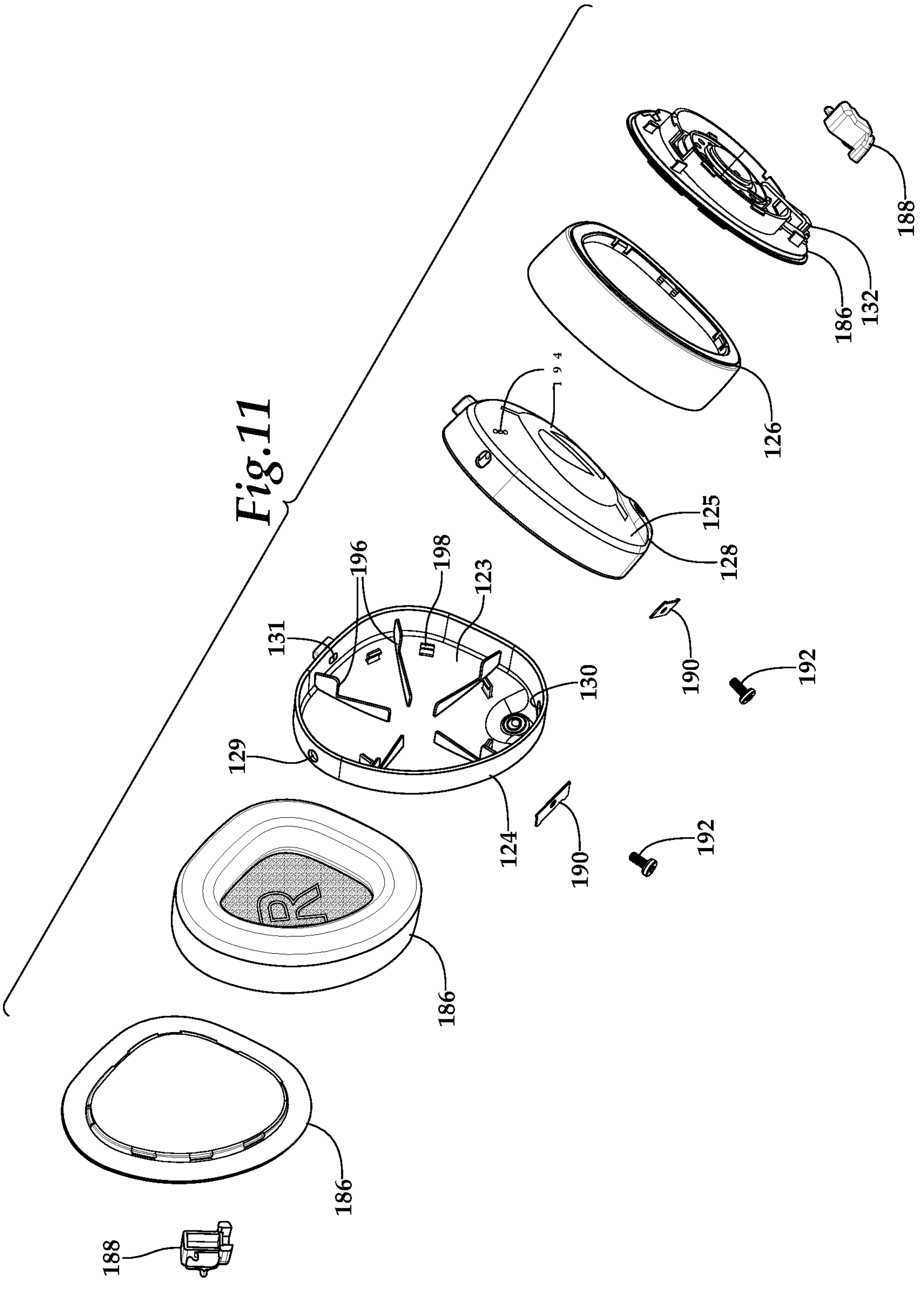
FIG. 11 illustrates an exploded view of earcup assembly.

As shown in FIG. 11, exterior surface 125 of frame 124 may include an indicia 194, such as letters, symbols, braille, and the like. In addition, exterior surface 125 may include extended portion 128 configured to create space for seal 188.

Frame 124 also may include several openings, such as a wire opening 129, an interface opening 130, and a post opening 131. Wire opening 129 may be configured to receive wire 122. As shown in FIG. 12, wire 122 may include a mass 152 configured to plug wire opening 129. Interface opening 130 is configured to receive an interface, which may couple with input port 132 of driver assembly 186.

Returning to FIG. 4, seal 188 may abut interface opening 129. Seal 188 may operate in conjunction with a connector or bayonet mount 134 of earcup assembly 104. For example, bayonet mount 134 may be include one or more radial pins. Each radial pin may be adapted to receive a corresponding female receptor with L-shaped slot. In operation, the female slot are inserted into bayonet mount 134 and caused to turn so that the radial pin engages the slot.

Figure 12B:
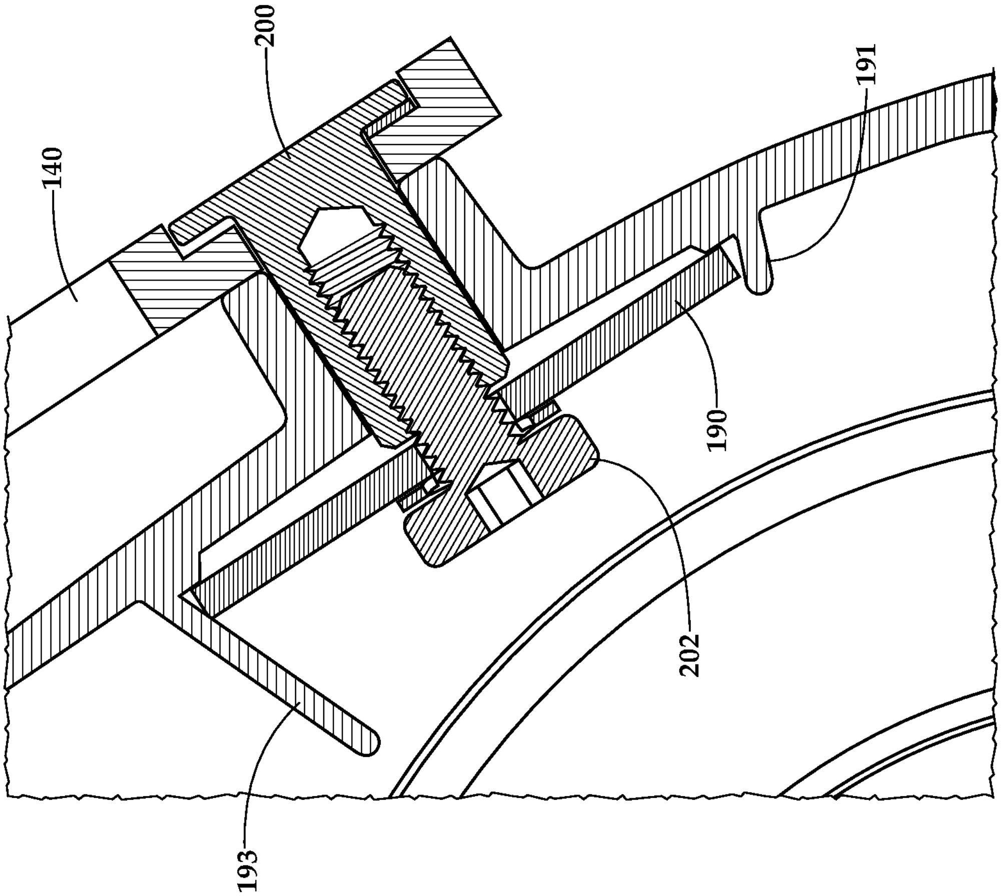
FIG. 12B is a sectional view illustrating an exemplary connection of the earcup frame to a bracket.
Figure 12A:
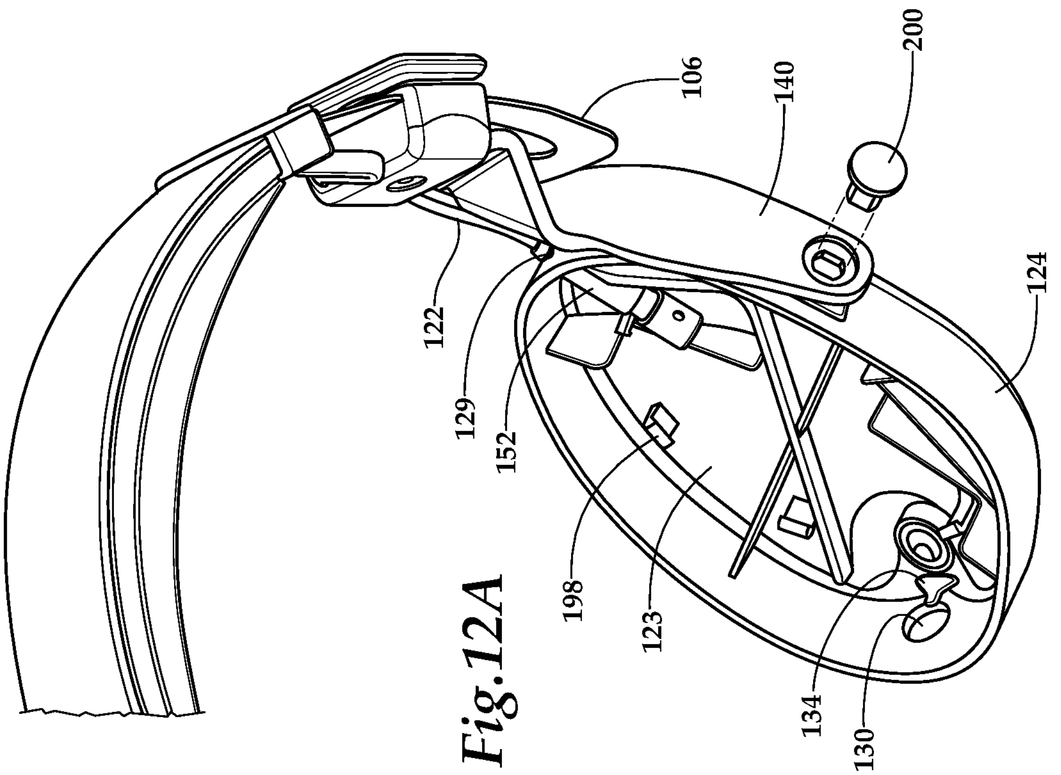
FIG. 12A illustrates a frame of the earcup assembly of FIG. 11.

FIGS. 12A-12B illustrate an exemplary attachment of frame 124 to bracket 140. In particular, interior surface 123 of post 124 may be configured to clutch a support plate 190 via a long branch 193 and a short branch 191, each of which are on either end of post opening 131. Post opening 131 may receive an insert 200 of bracket 140. Insert 200 may include a threaded interior configured to receive a corresponding fastener 202, which is placed through support plate 190. Fastener 202 may be inserted through a support plate 190. As such, bracket 140 may be pivotally attached to earcup assembly 104 to facilitate pivotal movement with respect to the headband assembly 102. In particular, bracket 140 may facilitate rotation of earcup assembly 104 on at least two axes with respect to headband assembly 102.

As shown in FIGS. 13A-13B, driver assembly 186 may be removably attached to frame 124. Driver assembly 186 may include a front surface 185 and a rear surface 187. As mentioned above, rear surface 187 may include connectors 204 corresponding to connectors 198 of frame 124. Various connectors are contemplated to secure driver assembly 186 to frame 124 including, for example, clips, clasps, snaps, buttons, hook and loop fasteners, and the like.

Driver assembly 186 may facilitate converting an electrical signal to a sound wave and outputting the converted sound wave to a user. Driver assembly 186 may include an input port 132 (FIG. 11) configured to receive, for example, a tip-sleeve (TS) interface, a tip-ring-sleeve (TSR) interface, a tip-ring-ring-sleeve (TRRS) interface, an RCA interface, an XLR interface, and the like. In one aspect, one earcup assembly 104 of headset 100 may include a first interface and the another earcup assembly 104 may include a second interface. By having multiple input ports, headset 100 may facilitate coupling with various devices. For example, a first input port may be configured to couple with an audio source and second input port may be configured to couple with a microphone.

Figure 14A:
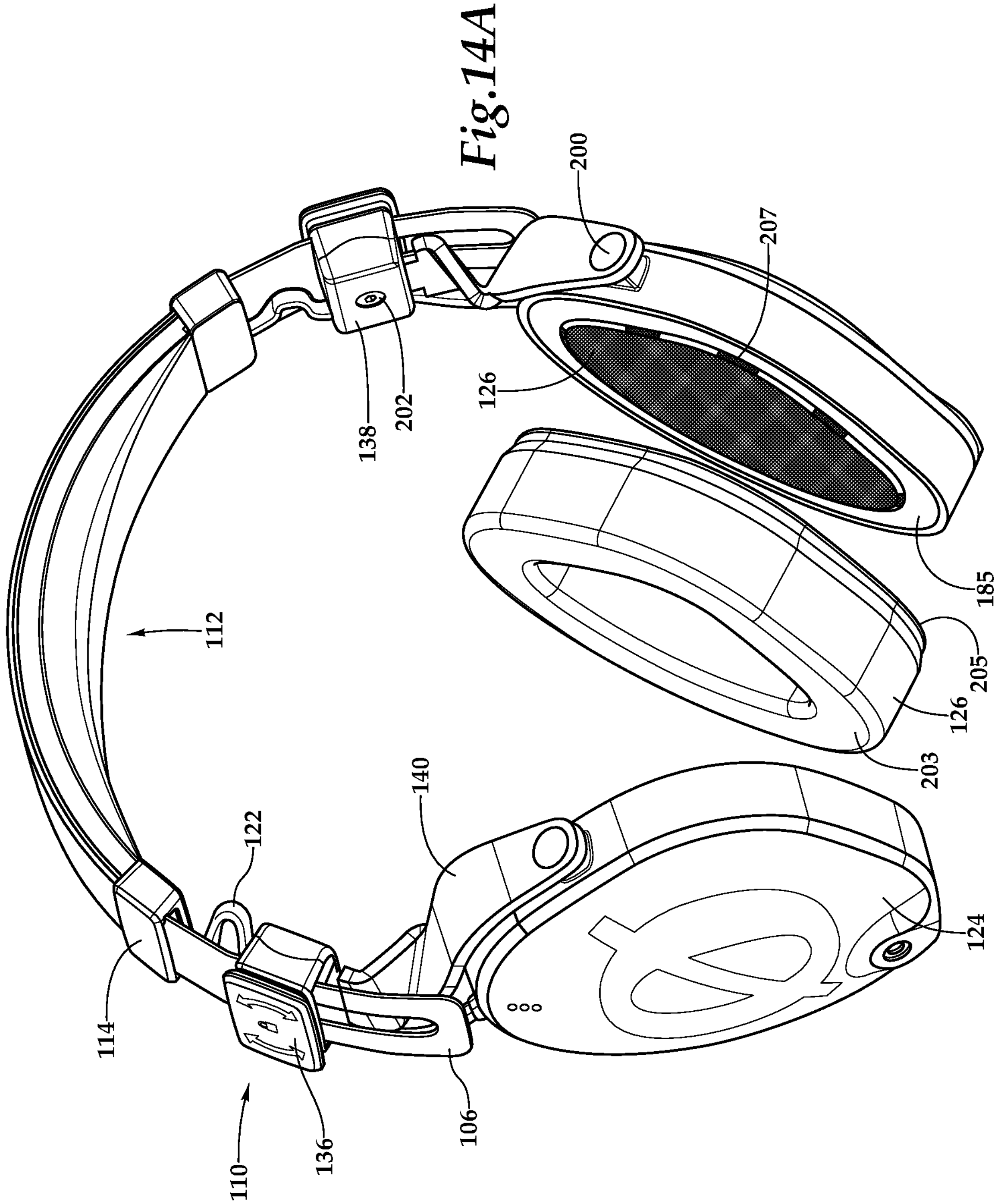
FIG. 14A illustrates an exemplary connection of earpad assembly to the driver assembly.
Figure 14C:
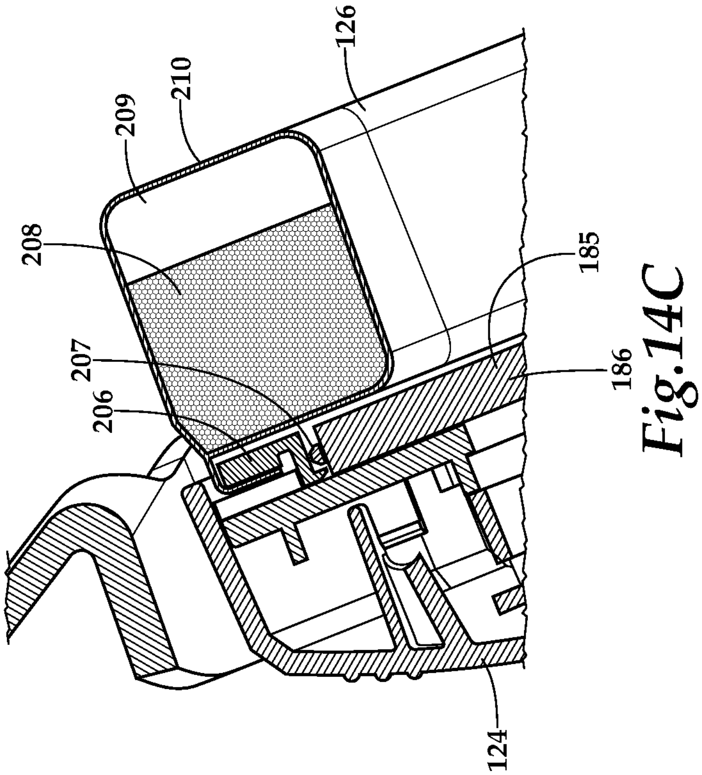
FIG. 14C is a sectional view illustrating the exemplary connection of the driver assembly to an earpad of FIG. 14A.
Figure 14B:
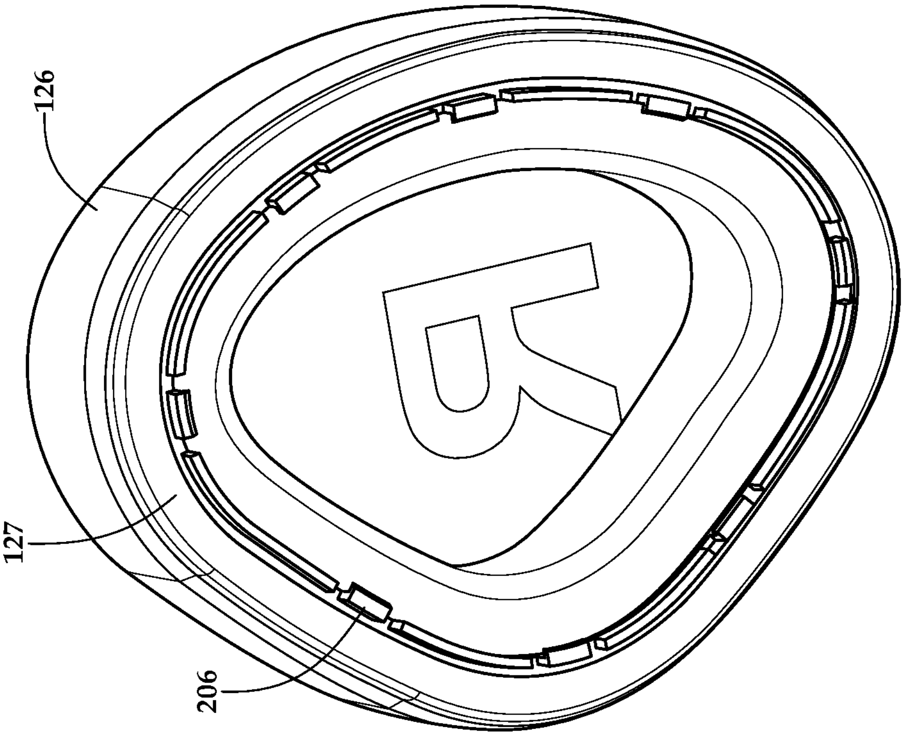
FIG. 14B illustrates a rear view of the earpad of FIG. 14A.

As shown in FIGS. 14A-14C, earpad 126 may be removably attached to driver assembly 186. As shown, earpad 126 may include a front surface 203 and a rear surface 205. Front surface 203 may include indicia to, for example, indicate to a user how to place the headset 100 on their head. Rear surface 205 may include connectors 206 corresponding to connectors 207 on front surface 185 of driver assembly 186. As above, various connectors are contemplated to secure earpad 126 to driver assembly 186 including, for example, clips, clasps, snaps, buttons, hook and loop fasteners, and the like.

Further, earpad 126 may include one or more layers to, for example, reduce user ear fatigue and discomfort. As shown in FIG. 14C, earpad 126 may include a first layer 208, second layer 209, and third layer 210. First layer 208 may be formed of a flexible polyurethane foam, e.g., memory foam, which may have properties that measure according to JIS K 6400. A thickness of first layer 208 may range between about ten millimeters and about twenty millimeters, and preferably between about twelve millimeters and about sixteen millimeters. In one embodiments, a thickness of first layer 208 may be about fourteen millimeters.

Second layer 209 may be a gel layer, which may be defined by an encasement of cooling gel. The second layer 209 may be adapted to absorb and retain cool temperatures and resist absorbing heat given off by a wearer's head. It is also contemplated that the second layer 209 may be configured to provide additional cushioning from impacts resulting from the customary use of the earpad 126. A thickness of second layer 209 may range between about four millimeters and about eight millimeters, and preferably between about five millimeters and about seven millimeters. In one embodiments, a thickness of second layer 209 may be about six millimeters.

Third layer 210 may be a membrane formed from an acoustically absorbent material and/or perforated leather, such as Alcantara. Third layer 210 may wrap around or cover other layers, such as first layer 208 and second layer 209. A thickness of third layer 210 may range between about a quarter of a millimeter and about three quarters of a millimeter, and preferably between about a third of a millimeter and about half of a millimeter. In one embodiments, a thickness of third layer 210 may be about four tenths of a millimeter.

In sum, headset 100 may be shaped to provide a comfortable and proper seal to a user. In addition, headset 100 may be configured to include various interchangeable components and may further include several input ports. Advantageously, the headset may be modular and also may facilitate coupling with one or more interfaces, such as an audio source and a microphone.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Components may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

The invention claimed is:

1. A headset comprising:

an earcup assembly;

a headband assembly including a bracket, said headband assembly further including a cushion assembly removably coupled to said bracket, wherein a top section of said cushion assembly includes a channel for guiding a wire;

one or more slots formed in said bracket, each slot configured to receive a locking mechanism, said locking mechanism operable for adjusting a distance between said headband assembly and said earcup assembly; and a post pivotally coupling said earcup assembly to said locking mechanism, said post configured to facilitate pivotal movement of said earcup assembly with respect to the headband assembly.

2. The headset of claim 1, wherein said top section is detachably coupled to a bottom section via a hook and loop fastener.

3. The headset of claim 1, wherein said cushion assembly is configured to connected to one or more stoppers of said headband assembly.

4. The headset of claim 1, wherein said locking mechanism is a cam assembly including a housing comprising a cam and a lock pad, said locking mechanism configured to compress around said bracket.

5. The headset of claim 4, wherein said cam assembly includes a thumb pad having a pin extending through said one or more slots and rotatably coupled to said cam of said housing.

6. The headset of claim 5, wherein said pin is operable to rotate said cam between a locked position and an unlocked position.

7. The headset of claim 6, wherein said cam comprises a front surface having one or more depressions and one or more protrusions, said depressions corresponding to the unlocked position and said protrusions corresponding to the locked position.

8. The headset of claim 1, wherein said post is curved to conform to a shape of said earcup assembly.

9. The headset of claim 1, wherein said earcup assembly is D-shaped.

10. The headset of claim 1, wherein said earcup assembly comprises a frame, a driver assembly, and an earpad.

11. The headset of claim 10, wherein said driver assembly is detachably connected to said frame.

12. The headset of claim 10, wherein said earpad is detachably connected to said driver assembly.

13. The headset of claim 10, wherein said earpad is formed of a one or more layers.

14. The headset of claim 13, wherein at least one layer is made of alcantara.

15. The headset of claim 13, wherein said one or more layers includes at least one of a memory foam layer and a cooling gel layer.

16. The headset of claim 1, wherein said earcup assembly includes a bayonet-type mount configured to connect to a corresponding bayonet-type fastener.

17. The headset of claim 1, further comprising a first input port and a second input port.

18. The headset of claim 17, wherein said first input port is configured to couple with an audio source and said second input port is configured to couple with a microphone.

19. A headset including a cam assembly, the headset comprising:

an earcup assembly;

a headband assembly including a bracket;

one or more slots formed in said bracket;

a cam assembly including a housing and a thumb pad, said thumb pad including a pin extending through said one or more slots and rotatably coupled to a cam of said housing such that cam assembly is configured to adjust a distance between said headband assembly and said earcup assembly; and a post pivotally coupling said earcup assembly to said locking mechanism, said post configured to facilitate pivotal movement of said earcup assembly with respect to the headband assembly.

20. The headset including a cam assembly of claim 19, wherein said pin is further configured to rotate said cam between a locked position and an unlocked position.

* * * * *